UNITED STATES PATENT OFFICE.

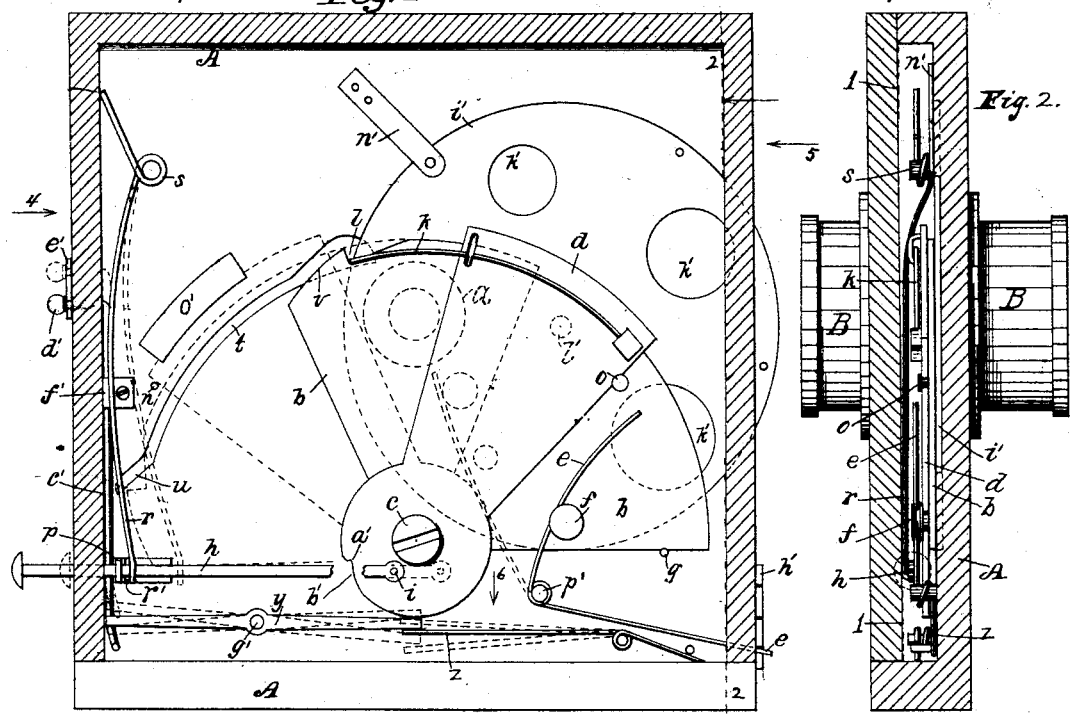
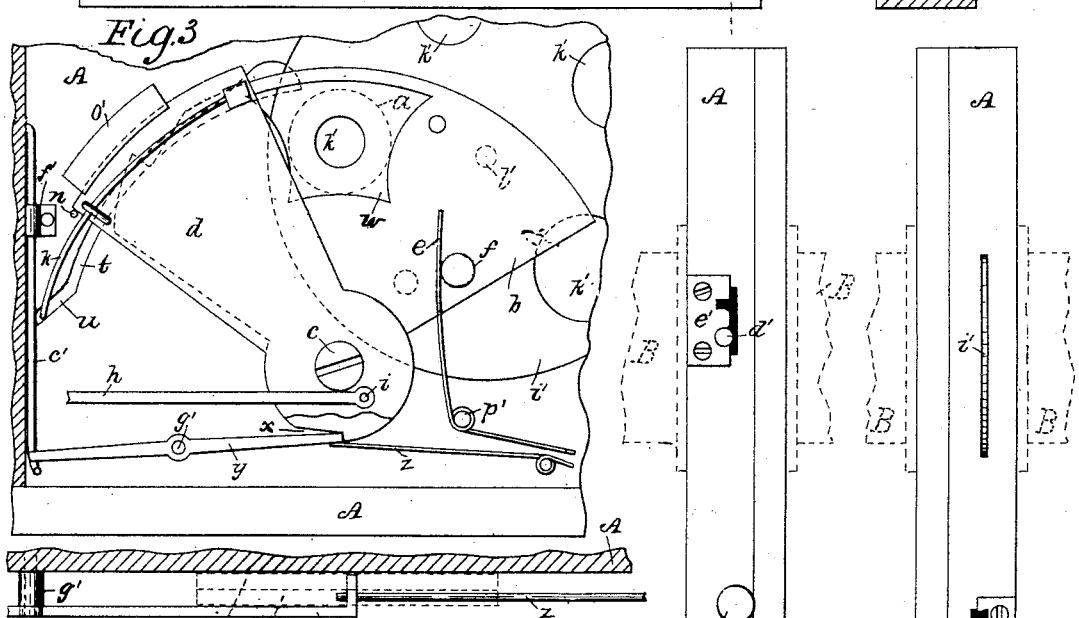
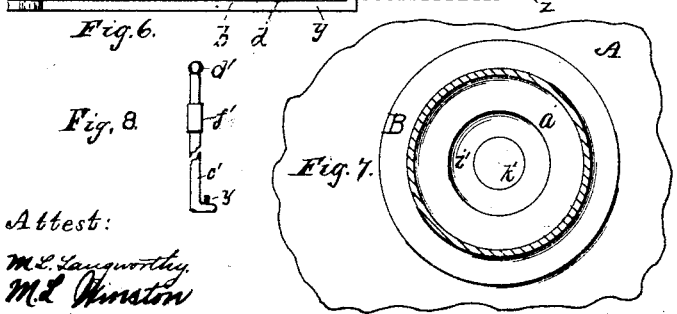

HARVEY B. CARLTON, OF ROCHESTER, NEW YORK.

CAMERA-SHUTTER.

SPECIFICATION forming part of Letters Patent No. 512,601, dated January 9, 1894.

Application filed January 13, 1893. Serial No. 458,162. (No model.)

*To all whom it may concern:*

Be it known that I, HARVEY B. CARLTON, of Rochester, in the county of Monroe and State of New York, have invented a new and useful Improvement in Camera-Shutters, which improvement is fully set forth in the following specification and shown in the accompanying drawings.

My invention relates mainly to the matter of operating the shutters of photographic cameras, and to the controlling of the time of the exposure. The construction of the device is such that when the parts are all properly set the exposure, whether instantaneous or prolonged, is effected and completed by pushing a single button or bar in convenient reach of the operator.

The invention is hereinafter more fully described and particularly pointed out in the claims.

Referring to the drawings Figure 1 is a front elevation of the device, the inclosing case being sectioned on the dotted line 1 1 in Fig. 2. Fig. 2 is an edge view with the case sectioned on the dotted line 2 2 in Fig. 1, and viewed as indicated by the arrow pointed thereon. Fig. 3 is an elevation similar to Fig. 1, showing some of the parts in different relative positions, parts being omitted. Figs. 4 and 5 are edge views of the case seen as indicated by arrows 4 and 5 respectively in Fig. 1. Fig. 6 drawn to a larger scale, is a horizontal section of a part of the case showing more fully the detent for the main shutter, the view being indicated by arrow 6 in Fig. 1. Fig. 7 shows a portion of the front of the case, with the exposure opening therein, and Fig. 8 is a detail view.

Referring to the parts shown, A is a thin inclosing case or holder, which forms the front wall or front of a camera obscura as, for instance, one for doing out-of-door work. This case is rectangular and usually made of wood, and formed with a front and a back plain vertical wall separated by a narrow space within which the operating parts are placed. The lenses, B, are secured to this case and it may be divided so that a part will be on either side of the case or wholly in front of the case, which matter is not material to my invention.

$a$ is the exposure opening through the case, which opening is circular and three-fourths of an inch more or less in diameter.

$b$ is the main shutter, it being a fan-shaped sheet or plate preferably of black hard rubber or metal, pivoted, at $c$, to the rear wall of the case so as to turn or move in a plane at right angles to the line of the exposure. $d$ is a smaller auxiliary shutter also fan-shaped, and held to turn upon the pivot $c$. This auxiliary shutter is, like the shutter $b$, a thin plate of hard rubber or similar substance, lying over or upon the shutter $b$ and in easy contact therewith, both adapted to turn independently of each other save as to certain restrictions hereinafter noted.

$e$ is a spring held upon a rigid stud $p'$ which bearing against a grooved head $f$ rigid in the shutter $b$ tends to hold the latter in its normal position, shown in full lines in Fig. 1, yet at the same time it permits the head to move along toward its free end as the shutter is opened, as shown in dotted lines in said Fig. 1. When in its normal position this shutter rests against a stop pin $g$ rigid in the case, and closes the exposure opening through $a$.

The two shutters are operated by means of a push-bar $h$, extending out at the side of the case which bar is connected with the auxiliary shutter $d$ by a pin $i$. The auxiliary shutter $d$ is normally connected with the main shutter $b$ by means of a readily tripped locking device the one shown, at $k$, being a spring held rigidly to $d$ and bent at its free end to rest in a notch $l$ in the edge of the shutter $b$. When the shutters are thus locked together and the push-bar is forced in by the operator it turns said shutters simultaneously to the positions shown in dotted lines in Fig. 1. In this position the shutter $d$ encounters a stop pin $n$ which limits its motion in that direction. In moving toward the right, as it appears in Fig. 1, the shutter $d$ is stopped by a pin $o$ rigid in the shutter $b$. Toward its left outer end the push-bar rests in a bearing $p$, rigid in the case. The push-bar moves endwise only, and it is kept in its normal position, to the left as shown in full lines in Fig. 1, by means of a spring $r$ held upon a stud $s$ rigid in the case. This spring bears directly against a small pin $r'$ passing through the push-bar. Thus, when the shutters are turned to the positions shown in dotted lines in Fig. 1 by pushing the bar $h$, and then released, the spring $e$ brings the shutter $b$ back to the stop pin $g$, and the spring $r$ causes the shutter $d$ to return to the stop pin $o$. The free end of the lock $k$ is turned abruptly toward the rear wall of the case, (or in a direction from the observer as it appears in Figs. 1 and 3,) and crosses the edge of the shutter $b$ and enters a curved channel $t$, formed in the face of said rear wall of the case. At its lower (left) end the channel is formed with a sharp outward slant $u$, up which the lock rides when the shutter $d$ is pushed to its extreme left position. This serves to raise the lock out of the notch $l$ and release the shutter $b$ which is instantly returned to its normal position by the spring $e$ as already stated. The shutter $d$ returns to its normal position only when the push-bar is released by the operator's finger. When the shutter $d$ is returning to its normal position, (the shutter $b$ having already reached its normal position,) the inturned end of the lock $k$ rides up the incline $u$ of the shutter $b$ and so again drops into the notch $l$. The channel $t$ is enlarged at this part to admit of this action of the lock.

The shutter $b$ is formed with an opening $w$, shown only in full lines in Fig. 3, which passes the exposure opening $a$ each time the shutter is turned from or to its normal position. When the shutter is in its normal position—to the right—the part of it at the left of the opening $w$ covers the exposure opening; and when in its position to the left the part of it at the right of said opening $w$ covers the exposure opening. The auxiliary shutter $b$ normally covers the opening $w$ so that when both shutters are moved together to the left by the push-bar $h$ there is no exposure made, for the opening $a$ is constantly covered by either one or the other of the shutters; but when the shutter $b$ is unlocked and released from the shutter $d$ by the means above described it instantly flies back to its normal position unaccompanied by the shutter $d$ and an instantaneous exposure is made while the opening $w$ is passing the exposure opening $a$. The shutter $d$ is allowed to return to its place against the stop pin $o$ by the operator removing his finger from the push-bar.

The operations just above described are to effect instantaneous exposures. To effect prolonged exposures other means are provided, as follows: The shutter $b$ is formed with a notch $x$, Fig. 3, in its lower edge and a detent, $y$, turning upon a rigid stud $g'$ is pressed into this notch by a spring $z$. The form of the operating end of the detent is better shown in Fig. 6. The notch $x$ is relatively so placed that when caught by the detent, while the shutter is returning to its normal position, the shutter will be held in a position in which the opening $w$ will stand opposite the exposure opening $a$, as shown in Fig. 3. Now as the auxiliary shutter is at the left of the exposure opening the exposure will continue as long as the operator chooses to press the push-bar. Thus an exposure of any length of time may be made at the will of the operator. The auxiliary shutter is formed with a notch or indentation $a'$, Fig. 1, merely to make way for the detent $y$ to enter the notch $x$, the hubs of both shutters surrounding the pivot $c$ being circular and of uniform diameter as will be seen by Fig. 3. The notch $a'$ is formed in the auxiliary shutter at such place that it will register with the notch $x$ when the two shutters stand in the positions shown in Fig. 3 in which a full exposure is being made. If now, when the parts occupy the positions shown in Fig. 3, the push-bar be released by the operator the shutters will both instantly return to their normal positions, shown in full lines in Fig. 1, for, the as auxiliary shutter is urged home by means of the spring $r$ the incline $b'$ of said shutter, adjacent to the notch $a'$, will push the detent $y$ downward out of the notch $x$ and thus release the shutter $b$. In case an instantaneous exposure is to be made the detent $y$ is thrown into a position of inaction by the operator pulling the rod $c'$ upward, as indicated by the dotted lines in Fig. 1. This controlling rod for the detent $y$ has its upper end turned abruptly outward through a wall of the case, see Figs. 1 and 4, and it is provided with a head $d'$ to be manipulated by the operator. The lower end of the rod is turned forward or toward the observer, as it appears in Figs. 1 and 3, and thus caused to pass in under the detent $y$. Now by raising the head $d'$ to the upper notch in the plate $e'$ (see Fig. 4) the operating end of the detent will be depressed against the action of the spring $z$, as indicated by dotted lines in Fig. 1, and held clear from the shutters. To make a prolonged exposure the head $d'$ is depressed to the position shown in full lines (also shown in Fig. 3), in which case the detent $y$ is delivered up to the control of the spring $z$, and caused to act as stated.

$f'$ is a bearing for holding the rod $c'$ in place. Near its lower end this rod is also guided and kept in place by the bearing $p$ of the push-bar.

The lower arm of the speed-regulating spring $e$ extends outward through a wall of the case, Figs. 1 and 5, and is controlled by a notched plate $h'$. By depressing the outer end of this spring to the lowest notch the tension of the spring will be increased and the speed with which the shutter $b$ is made to pass the exposure opening will be consequently increased. This serves to shorten the durations of the "instantaneous" exposure. By raising the spring to the upper notch in the plate the tension of the spring will be decreased, resulting in a slower motion of the shutter and slightly lengthened "instantaneous" exposure. With this device I use the ordinary rotatory removable diaphragm $i'$, pierced with exposure apertures $k'$ of different diameters. I usually let this diaphragm into a circular recess in the rear wall of the case, as it appears in Fig. 2, with its outer flat surface even with the inner surface of said wall. The inner surface of the shutter $b$ just clears the face of the diaphragm and also the surface of the wall of the case holding the diaphragm. The diaphragm turns on a stud $l'$ rigid with the wall of the case and the apertures $k'$ are so placed that they successively pass the exposure opening when the diaphragm is turned. The usual detent $n'$ is employed to hold the diaphragm in its different positions of adjustment.

I find it desirable to employ a guide or keeper $o'$ for the auxiliary shutter. This guide is a simply constructed block or body secured to the case and formed with a longitudinal groove or rabbet through which the upper edge of the shutter passes when turned to the left by the push-bar. The shutter is thus held steady during the operation of the unlocking of the main shutter, and the guide serves to render this operation more certain.

What I claim as my invention is—

1. In a camera shutter, in combination, a case provided with an exposure opening, a main and an auxiliary shutter pivotally secured within the case, the main shutter being provided with a notch adjacent to its pivotal point and the auxiliary shutter being provided with an inclined portion adjacent to the notch of the main shutter, a spring actuated detent pivotally secured within the case, one end of which is adapted to engage with the notch and the inclined portion of the shutter, a rod connected with the other end of the detent, the free end of which projects through the side of the case, stops for engaging with the free end of the rod, and means for operating the shutters, substantially as set forth.

2. In a photographic camera shutter, the combination, with a case having a segmental slot, one end of which is formed with an outward extension and the other end is enlarged, of a main and an auxiliary shutter pivotally secured to the case, the main shutter being provided with an inclined projection at its free end, a spring detent on the auxiliary shutter, the free end of which is adapted to engage with the projection of the main shutter and is movable within the slot in the case, a push bar for moving the shutters in one direction, and means for returning them to their original position, substantially as set forth.

In witness whereof I have hereunto set my hand, this 7th day of January, 1893, in the presence of two subscribing witnesses.

HARVEY B. CARLTON.

Witnesses:
 ENOS B. WHITMORE,
 M. L. WINSTON.